(12) United States Patent
Hirase et al.

(10) Patent No.: US 9,945,464 B2
(45) Date of Patent: Apr. 17, 2018

(54) TRANSMISSION APPARATUS

(71) Applicant: Kubota Corporation, Osaka-shi (JP)

(72) Inventors: Yuji Hirase, Sakai (JP); Hidetoshi Hana, Sakai (JP); Tsuyoshi Gono, Sakai (JP)

(73) Assignee: Kubota Corporation, Osaka (JP)

( * ) Notice: Subject to any disclaimer, the term of this patent is extended or adjusted under 35 U.S.C. 154(b) by 40 days.

(21) Appl. No.: 15/131,240

(22) Filed: Apr. 18, 2016

(65) Prior Publication Data

US 2016/0312872 A1 Oct. 27, 2016

(30) Foreign Application Priority Data

Apr. 21, 2015 (JP) ................. 2015-086750

(51) Int. Cl.
| | |
|---|---|
| *F16H 47/04* | (2006.01) |
| *F16H 3/72* | (2006.01) |
| *F16H 37/08* | (2006.01) |
| *B60K 25/02* | (2006.01) |
| *B62D 49/06* | (2006.01) |
| *F16H 37/04* | (2006.01) |
| *F16H 57/04* | (2010.01) |

(52) U.S. Cl.
CPC ............ *F16H 47/04* (2013.01); *B60K 25/02* (2013.01); *B62D 49/06* (2013.01); *F16H 37/042* (2013.01); *F16H 57/0457* (2013.01); *B60K 2025/024* (2013.01); *B60Y 2200/221* (2013.01); *B60Y 2200/40* (2013.01); *B60Y 2400/73* (2013.01); *B60Y 2400/87* (2013.01); *F16H 2037/0886* (2013.01)

(58) Field of Classification Search
CPC .. F16H 47/04; F16H 2047/045; F16H 37/042; F16H 2037/0886; F16H 39/00–39/42
See application file for complete search history.

(56) References Cited

U.S. PATENT DOCUMENTS

| | | |
|---|---|---|
| 3,969,958 A | 7/1976 | Miyao et al. |
| 5,129,867 A | 7/1992 | Fredriksen et al. |
| 5,156,577 A | 10/1992 | Fredriksen et al. |
| (Continued) | | |

FOREIGN PATENT DOCUMENTS

| | | |
|---|---|---|
| DE | 3726081 A1 | 2/1989 |
| DE | 4125988 A1 | 1/1993 |
| JP | 2012040944 A | 3/2012 |

*Primary Examiner* — Justin Holmes
*Assistant Examiner* — David R Morris
(74) *Attorney, Agent, or Firm* — The Webb Law Firm

(57) ABSTRACT

A transmission apparatus D that can avoid size-up of a starter through reduction of load torque required at the time of start-up of an engine, includes a traveling transmission device D1 configured to transmit power outputted from an engine 3a via a forward/reverse switching mechanism 50 acting also as a main clutch mechanism, a hydrostatic stepless speed changer mechanism 20 acting as a main speed changer mechanism, a planetary gear mechanism 40 and an auxiliary speed changer mechanism 60 to traveling components such as front wheels 1, rear wheels 2, etc., and an implement transmission device D2 configured to transmit the power outputted from the engine 3a via an implement clutch 70, an implement speed changer mechanism 71, and a PTO shaft 7 to an implement.

7 Claims, 3 Drawing Sheets

(56) References Cited

U.S. PATENT DOCUMENTS

| | | | | |
|---|---|---|---|---|
| 5,931,758 A * | 8/1999 | Walter | ............... | F16H 47/04 475/72 |
| 8,308,597 B2 * | 11/2012 | Hiraoka | ............ | F16H 47/04 475/219 |
| 8,657,713 B2 * | 2/2014 | Hana | ............ | F16H 47/04 180/53.4 |
| 2004/0209718 A1 * | 10/2004 | Ishibashi | ............ | B60W 10/103 474/18 |
| 2008/0214351 A1 * | 9/2008 | Katayama | ............ | F16H 47/04 475/296 |
| 2009/0156345 A1 * | 6/2009 | Ishimori | ............ | F16H 47/04 475/116 |
| 2009/0270212 A1 * | 10/2009 | Ueda | ............ | F16H 47/04 475/74 |
| 2009/0280944 A1 * | 11/2009 | Hiraoka | ............ | F16H 37/042 475/116 |
| 2010/0151984 A1 * | 6/2010 | Viitasalo | ............ | F16H 47/04 475/269 |
| 2010/0184551 A1 | 7/2010 | Hiraoka et al. | | |
| 2012/0046138 A1 | 2/2012 | Hana et al. | | |
| 2014/0128196 A1 * | 5/2014 | Rintoo | ............ | F16H 47/04 475/204 |
| 2014/0357447 A1 | 12/2014 | Rintoo | | |
| 2015/0072823 A1 * | 3/2015 | Rintoo | ............ | F16H 61/0403 475/72 |
| 2015/0292610 A1 * | 10/2015 | Rintoo | ............ | F16H 3/728 475/72 |

\* cited by examiner

TRANSMISSION APPARATUS

CROSS-REFERENCE TO RELATED APPLICATION

This application claims priority to Japanese Patent Application No. 2015-086750 filed Apr. 21, 2015, the disclosures of which is hereby incorporated in its entirety by reference.

FIELD OF THE INVENTION

The present invention relates to a transmission apparatus provided in a tractor and configured to transmit power outputted from an engine to a traveling device and an implement (utility work implement).

DESCRIPTION OF RELATED ART

As an example of the transmission apparatus of the above-noted type, there is one known from Japanese Unexamined Patent Application Publication No. 2012-40944 for instance. According to the transmission apparatus described in this document, power outputted from the engine is transmitted to a rear wheel drive shaft via a dry clutch mechanism, an HST as a hydrostatic stepless speed changer mechanism, a planetary gear mechanism, a forward/reverse switching mechanism, and an auxiliary speed changer mechanism.

In case the above-described transmission apparatus is applied to a tractor, there is the possibility that a following problem may occur.

With a large-sized tractor, the power outputted from its engine is large, so that there occurs significant frictional wear in the dry clutch mechanism as a clutching function, so frequency of replacement thereof tends to be high.

Then, it is conceivable to omit a dry clutch mechanism. In this case, however, it becomes necessary for the required clutching function to rely on a wet type clutch mechanism included in the forward/reverse switching mechanism.

However, the forward/reverse switching mechanism is disposed at a stage subsequent to (downstream of) the planetary gear mechanism. So, at the time of start-up of the engine, it is necessary to rotate the output shaft of the engine together with the HST, the planetary gear mechanism and the wet type clutch of the forward/reverse switching mechanism all at one time. In this, inertias and resistive torques of the HST, the planetary gear mechanism and the wet type clutch of the forward/reverse switching mechanism are significant, a load torque will be applied to the starter. Thus, size-up of the starter is needed.

SUMMARY OF THE INVENTION

The object of the present invention is to provide a transmission apparatus that can avoid size-up of the starter through reduction of the load torque required at the time of start-up of an engine.

For accomplishing the above-noted object, according to a characterizing feature of the present invention, there is provided a transmission apparatus provided in a tractor and configured to transmit power outputted from an engine to a traveling device and an implement, the transmission apparatus comprising:

a forward/reverse switching mechanism;
a hydrostatic stepless speed changer mechanism;
a planetary gear mechanism;
a rear wheel driving section; and
an implement clutch;
wherein the forward/reverse switching mechanism includes:
a forward/reverse switching mechanism input section configured to input power outputted from an engine output section included in the engine, and
a forward/reverse switching mechanism output section configured to switch over the power inputted to the forward/reverse switching mechanism input section to forward rotation or reverse rotation and to output the resultant power;
wherein the stepless speed changer mechanism includes:
a stepless speed changer mechanism input section configured to input the power outputted from the forward/reverse switching mechanism output section, and
a stepless speed changer mechanism output section configured to steplessly speed-change the power inputted to the stepless speed changer mechanism input section and to output the resultant power;
wherein the planetary gear mechanism includes:
a planetary gear mechanism first input section configured to input the power outputted from the stepless speed changer mechanism output section,
a planetary gear mechanism second input section configured to input the power outputted from the forward/reverse switching mechanism output section without the power being steplessly speed-changed by the stepless speed changer mechanism, and
a planetary gear mechanism output section configured to synthetize the powers inputted to the planetary gear mechanism first input section and the planetary gear mechanism second input section and to output the resultant synthesized power;
wherein the rear wheel driving section includes a rear wheel driving section input section configured to input the power outputted from the planetary gear mechanism output section; and
wherein the implement clutch includes:
an implement clutch input section configured to input the power outputted from the engine output section, and
an implement clutch output section capable of outputting the power inputted to the implement clutch input section.

According to the above-described configuration, the forward/reverse switching mechanism is disposed immediately downstream of the engine. Therefore, at the time of start-up of the engine, the forward/reverse switching mechanism can realize a state wherein power outputted from the engine output section is not transmitted to the respective mechanisms disposed downstream of the forward/reverse switching mechanism. Thus, increase of load torque which would occur in the case of the arrangement of the forward/reverse switching mechanism being disposed downstream of the planetary gear mechanism can be avoided. As a result, the size-up of the starter can be avoided. Consequently, increase of spaces occupied by the starter, a battery, harness etc. and increase of costs thereof can be avoided.

In this invention, preferably:

respective rotational axes of at least the engine output section, the forward/reverse switching mechanism input section, the planetary gear mechanism first input section, the planetary gear mechanism second input section, the planetary gear mechanism output section, and the implement clutch input section are disposed on a common first axis;

a second axis in agreement with a rotational axis of the rear wheel driving section input section is disposed downwardly of the first axis;

a third axis in agreement with a rotational axis of the stepless speed changer mechanism input section and a fourth axis in agreement with a rotational axis of the stepless speed changer mechanism output section are disposed downwardly of the first axis and upwardly of the second axis; and the first axis, the second axis, the third axis and the fourth axis are disposed parallel with each other along a front/rear direction of the tractor in a side view of the tractor.

Generally, in order for one of two parallel rotational shafts to transmit power to the other, an arrangement such as meshing gears mounted on the rotational shafts or setting a chain or a transmission belt between sprockets mounted on the rotational shafts is needed and to this end, a large space is required. Further, the greater the presence of the gears or the like, the more reduction will occur in the transmission efficiency.

Whereas, in the case of the above-described arrangement that respective rotational axes of at least the engine output section, the forward/reverse switching mechanism input section, the planetary gear mechanism first input section, the planetary gear mechanism second input section, the planetary gear mechanism output section, and the implement clutch input section are disposed on a common first axis, such increase of space and reduction in transmission efficiency can be avoided.

In the present invention, preferably, the third axis and the fourth axis are disposed in distribution on the left side and the right side of the first axis in a front view of the tractor.

The stepless speed changer mechanism includes at least a hydraulic pump and a hydraulic motor and mechanisms interposed therebetween such as a hydraulic circuit, a hydraulic cylinder for driving a swash plate of the hydraulic pump, etc. and these components require some space for their disposing. If, for instance, the stepless speed changer mechanism were disposed only one either left or right side of the first axis in the front view of the tractor, this would cause need to reinforce a vehicle body frame or to increase the width of the vehicle body on the side where the stepless speed changer mechanism is disposed.

Then, by disposing the hydraulic pump having a pump shaft as the stepless speed changer mechanism input section and the hydraulic motor having a motor shaft as the stepless speed changer mechanism output section in distribution on the left and right sides of the rotational axis of the engine output section in the front view of the tractor, left/right uneven increase of reinforcement of the vehicle body frame or width increase of the vehicle body can be avoided.

In the present invention, preferably, the transmission apparatus further comprises a PTO (power takeoff) section configured to input the power outputted from the implement clutch output section and to output this power to the implement; and wherein a rotational axis of the PTO section is disposed in agreement with the second axis.

The implement input section for inputting power outputted from a PTO section included in the various implements connected to the rear portion of the vehicle body of the tractor can be disposed at a same height as the rear wheel driving section. Therefore, in comparison with an arrangement of the implement input section being disposed at a same height as the engine output section, the implement too can be formed compact.

In the present invention, preferably, an oil level of lubricant oil is set as the height of the second axis.

Normally, inside a casing of the transmission apparatus, an amount of lubricant oil is charged in a sealed manner for lubricating the various mechanisms when needed.

The oil level of lubricant oil is set approximately at the height of the rear wheel driving section, since it is desirable for a rear wheel drive shaft to be fed with the lubricant oil constantly.

On the other hand, the forward/reverse switching mechanism, the planetary gear mechanism and the implement clutch always do not need lubricant oil. Then, if the forward/reverse switching mechanism, the planetary gear mechanism and the implement clutch that always do not need lubricant oil were disposed at heights below the oil level of the lubricant oil, this would not only provide resistance to the rotations of the forward/reverse switching mechanism, the planetary gear mechanism and the implement clutch, but also cause such inconvenience as unnecessary heat generation due to stirring of the lubricant oil.

Then, by setting the lubricant oil level at the height of the second axis which is disposed downwardly of the first axis, at least the forward/reverse switching mechanism, the planetary gear mechanism and the implement clutch will be disposed upwardly of the rear wheel driving section, so that the above-described inconvenience can be avoided.

DETAILED DESCRIPTION OF THE PREFERRED EMBODIMENTS

Next, embodiments of the present invention will be explained with reference to the accompanying drawings.

Figure 1:
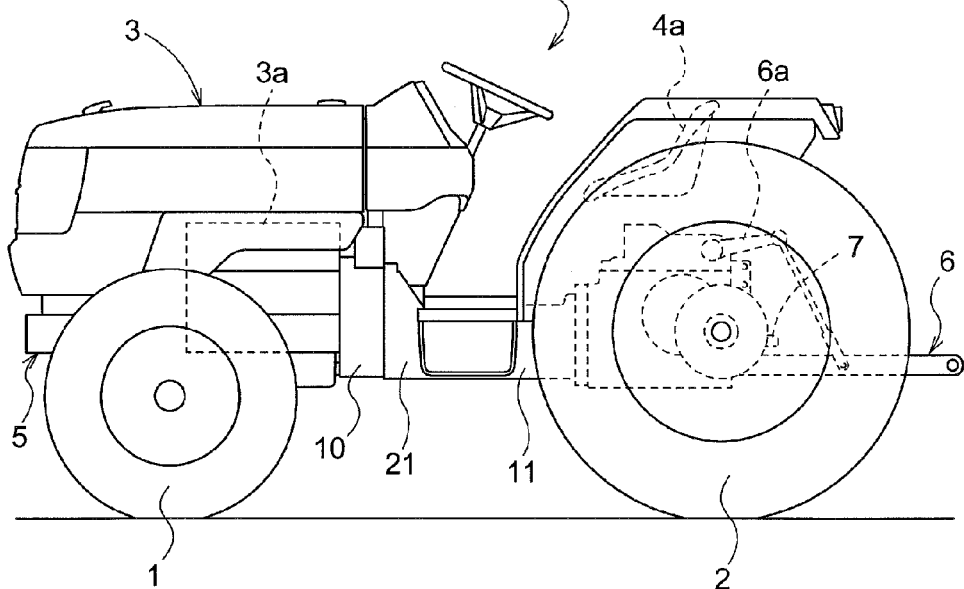
FIG. 1 is a side view showing a tractor in its entirety.

FIG. 1 is a side view showing a tractor relating to an embodiment of the present invention in its entirety. The tractor relating to this embodiment is not particularly limited, but can be classified as a large tractor having horsepower of 60 to 100.

This tractor comprises a link mechanism 6 including a pair of left and right pivotally operable lift arms 6a disposed in distribution on the opposed sides at the rear end portion of a vehicle body frame 5, and a PTO (power take-off) shaft 7 projecting toward the rear side of the vehicle body from the rear end portion of the vehicle body frame 5 in a self-propelled vehicle. This self-propelled vehicle comprises a pair of left and right steerable and drivable front wheels 1, a pair of left and right drivable rear wheels 2, an engine section 3 having an engine 3a mounted at a front portion of the vehicle body, and a driving section 4 having a driver's seat 4a mounted at a rear portion of the vehicle body. Incidentally, the PTO shaft 7 constitutes what is referred to herein as a "PTO section".

This tractor is to constitute e.g. a riding cultivator when a rotary cultivator implement 17 (shown in FIG. 2) is connected to a rear portion of the vehicle body via a link mechanism 6 to be liftable and power outputted from the engine 3a is transmitted from the PTO shaft 7 to an input shaft of the rotary cultivator implement 17. Incidentally, the input shaft of the rotary cultivator implement 17 constitutes what is referred to herein as an "implement input section".

In this way, as various implements 17 are liftably and drivably connected to the rear portion of the vehicle body, various kinds of riding work vehicles are constituted.

The vehicle body frame 5 includes the engine 3a, a clutch housing 10 extending continuously from a rear portion of the engine 3a, a stepless speed changer case 21 whose front portion is detachably attached to a rear portion of the clutch housing 10, a transmission case 11 connected to a rear portion of the stepless speed changer case 21. Although the clutch housing 10 and the stepless speed changer case 21 are formed integral, the inside thereof is divided into two regions by an inner partitioning wall. Incidentally, the clutch housing 10 and the stepless speed changer case 21 can be formed separately, so that a front wall of the stepless speed changer case 21 is detachably attached to a rear wall of the clutch housing 10.

Figure 2:
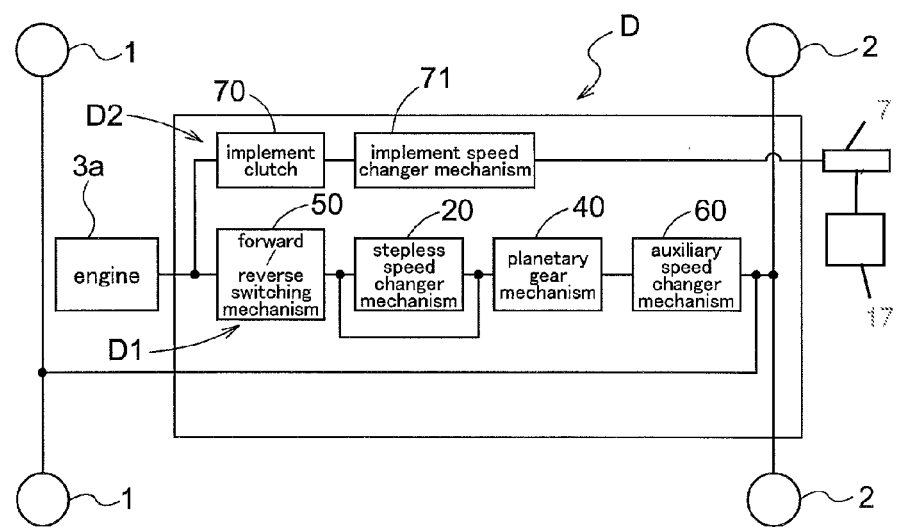
FIG. 2 is a block diagram showing a transmission apparatus.
Figure 3:
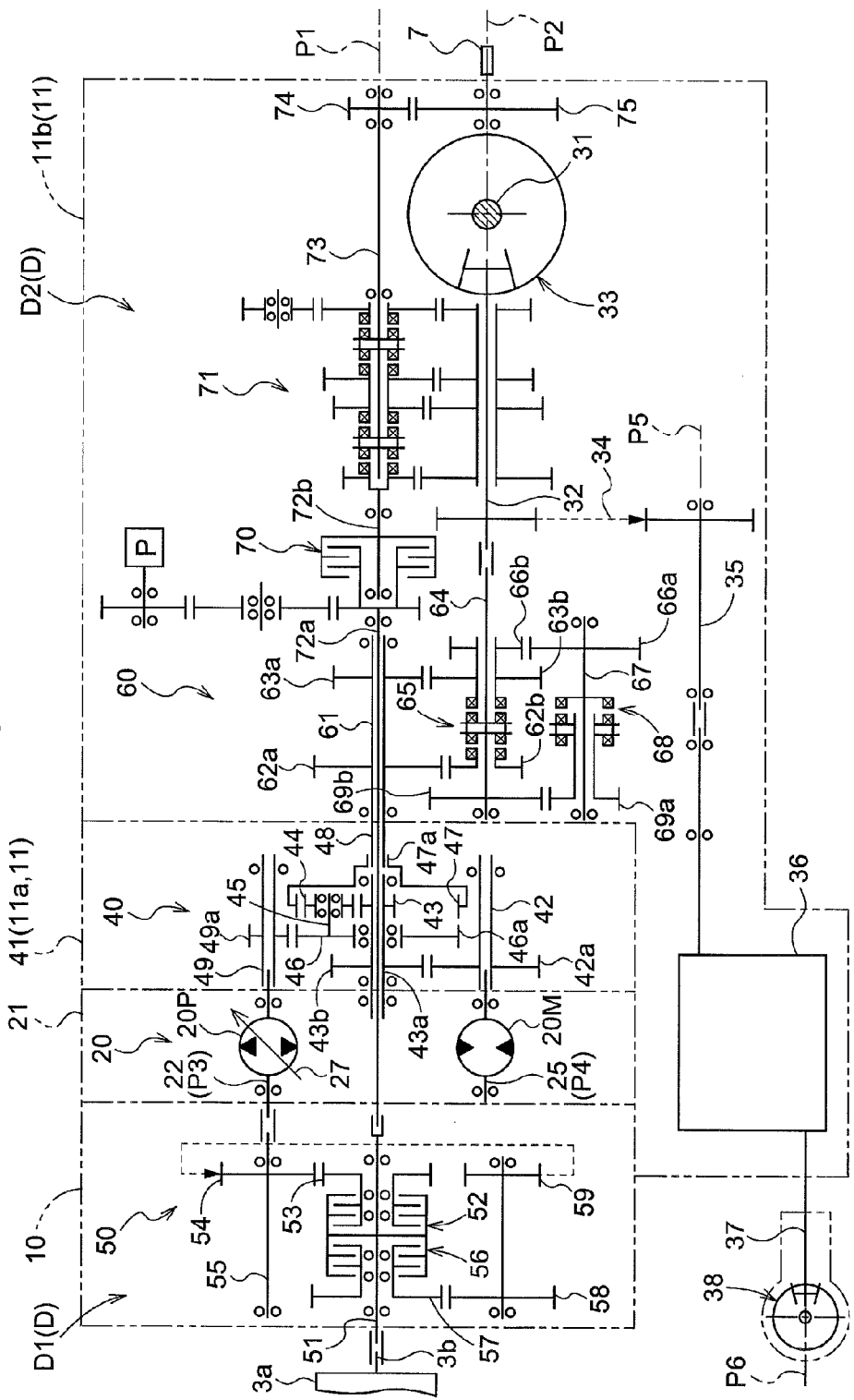
FIG. 3 is a skeleton view showing the transmission apparatus.

FIG. 2 and FIG. 3 show a transmission apparatus D provided in the tractor for transmitting power outputted by the engine 3a to the front wheels 1, the rear wheels 2 and the PTO shaft 7.

As shown in FIG. 2, the transmission apparatus D includes a traveling transmission device D1 and an implement transmission device D2.

The traveling transmission device D1 is configured to transmit the power outputted from the engine 3a to the traveling units such as the front wheels, the rear wheels 2, etc. via a forward/reverse switching mechanism 50 acting also as a main clutch mechanism, a hydrostatic stepless speed changer mechanism 20 as a main speed changer mechanism, a planetary gear mechanism 40 and an auxiliary speed changer mechanism 60.

The implement transmission device D2 is configured to transmit the power outputted from the engine 3a to an implement such as the rotary cultivator implement via an implement clutch 70, an implement speed changer mechanism 71 and the PTO shaft 7.

With reference to FIG. 3, the details of the transmission apparatus D will be explained next.

With the configuration of the traveling transmission device D1 in operation, the power outputted by the engine 3a is inputted via the output shaft 3b to the stepless speed changer mechanism 20 and the planetary gear mechanism 40 via the forward/reverse switching mechanism 50. Then, the power is transmitted from an output shaft 48 of the planetary gear mechanism 40 to the auxiliary speed changer mechanism 60 and transmitted from an output shaft 64 of the auxiliary speed changer mechanism 60 to a rear axle 31 via a rear wheel drive shaft 32 and a rear wheel differential mechanism 33. Also, the power is transmitted from the auxiliary speed changer mechanism 60 via a gear coupling mechanism 34, a front wheel drive shaft 35, a front wheel speed changer mechanism 36 and a front wheel speed changer drive shaft 37 to a front wheel differential mechanism 38. Incidentally, the output shaft 3b constitutes what is referred to herein as an "engine output section". The rear axle 31, the rear wheel drive shaft 32, the rear wheel differential mechanism 33, etc. together constitute a "rear wheel drive section" for driving the rear wheels 2. The rear wheel drive shaft 32 constitutes a "rear wheel drive section input section". The output shaft 48 constitutes a "planetary gear mechanism output section".

With the configuration of the implement transmission device D2 in operation, the power outputted by the engine 3a via the output shaft 3b is inputted via the implement clutch 70 to the implement speed changer mechanism 71 to be speed-changed therein in multiple speed steps. Then, the speed-changed power is transmitted to the PTO shaft 7. With the configuration of the implement clutch 70 in operation, via the forward/reverse switching mechanism 50 to be described later, in association with pressed-contact or detachment of an input side clutch plate mounted on an input side power transmission shaft 72a connected to the output shaft 3b to be rotatable therewith to/from an output side clutch plate mounted on an output side power transmission shaft 72b to be rotatable therewith, the power of an input side power transmission shaft 72a can be selectively transmitted or non-transmitted to via the output side power transmission shaft 72b. Incidentally, the input side power transmission shaft 72a constitutes what is referred to herein as an "implement clutch input section" and the output side power transmission shaft 72b constitutes what is referred to herein as an "implement clutch output section".

The forward/reverse switching mechanism 50 is disposed in the clutch housing 10 provided at a front portion of the stepless speed changer case 21. The stepless speed changer mechanism 20 is disposed in the stepless speed changer case 21 connected to a front portion of a front transmission case 11a. The planetary gear mechanism 40 is disposed in the front transmission case 11a. The auxiliary speed changer mechanism 60, the rear wheel differential mechanism 33, the front wheel speed changer mechanism 36, the front wheel differential mechanism 38, the implement clutch 70 and the implement speed changer mechanism 71 are disposed in a rear transmission case 11b.

The forward/reverse switching mechanism 50 includes an input shaft 51 connected to the output shaft 3b of the engine 3a to be rotatable therewith, a forward transmission section configured to transmit power of the input shaft 51 via a forward clutch 52 and a forward output gear 53 to an output shaft 55 rotatable with a transmission gear 54, and a reverse transmission section configured to transmit the power of the input shaft 51 via a reverse clutch 56, a transmission gear 57, a reverse gear 58 and a reverse output gear 59 to the output shaft 55 rotatable with the transmission gear 54. Incidentally, the input shaft 51 constitutes what is referred to herein as a "forward/reverse switching mechanism input section". The output shaft 55 constitutes what is referred to herein as a "forward/reverse switching mechanism output section".

Therefore, the forward/reverse switching mechanism 50 is rendered into a forward traveling state when the forward clutch 52 is operated into an engaged state and the reverse clutch 56 is operated into a non-engaged state, whereby the power transmitted from the output shaft 3b of the engine 3a to the input shaft 51 is converted into a forward traveling power by the forward transmission section and this power is outputted from the output shaft 55 to the stepless speed changer mechanism 20.

The forward/reverse switching mechanism 50 is rendered into a reverse traveling state when the forward clutch 52 is operated into a disengaged state and the reverse clutch 56 is operated into an engaged state, whereby the power transmitted from the output shaft 3b of the engine 3a to the input shaft 51 is converted into a reverse traveling power by the reverse transmission section and this power is outputted from the output shaft 55 to the stepless speed changer mechanism 20.

The forward/reverse switching mechanism 50 is rendered into a non-power-transmitting state when both the forward clutch 52 and the reverse clutch 56 are operated into the respective disengaged states, whereby the power transmitted from the output shaft 3b of the engine 3a to the input shaft 51 is not transmitted to the stepless speed changer mechanism 20. Incidentally, the forward clutch 52 and the reverse clutch 56 are constituted respectively of a wet type clutch.

At the time of start-up of the engine 3a, the forward/reverse switching mechanism 50 can realize a state wherein the power of the engine 3a is not transmitted to any respective mechanisms downstream of this forward/reverse switching mechanism 50. With this arrangement, it is possible to avoid increase of load torque which would occur in the case of e.g. arranging the forward/reverse switching mechanism 50 downstream of the planetary gear mechanism 40. Thus, size-up of the starter can be avoided. And, with this avoidance of size-up of the starter, increase of the space occupied by such components as the starter, a battery, a harness etc. and increase of costs thereof can be avoided advantageously.

The stepless speed changer mechanism 20 includes a hydraulic pump 20P and a hydraulic motor 20M which are disposed inside the stepless speed changer case 21. The hydraulic pump 20P and the hydraulic motor 20M are disposed side by side inside the stepless speed changer case 21 in a transverse direction of the vehicle body in a plane view of the vehicle body. The hydraulic pump 20P is constituted of a hydraulic pump which is of variable displacement type and has an axial plunger configuration. The hydraulic motor 20M is constituted of a hydraulic motor of an axial plunger configuration. The stepless speed changer case 21 has an unillustrated port plate.

According to the configuration of the stepless speed changer mechanism 20 in operation, the power outputted from the output shaft 55 of the forward/reverse switching mechanism 50 is inputted to a pump shaft 22 of the hydraulic pump 20P, whereby a cylinder block of this hydraulic pump 20P is rotatably driven by the pump shaft 22, so that the hydraulic pump 20P supplies pressure oil to the hydraulic motor 20M. And, a cylinder block of the hydraulic motor 20M is rotatably driven by the pressure oil from the hydraulic pump 20P, thereby to rotatably drive a motor shaft 25, and the power is outputted from this motor shaft 25 to the planetary gear mechanism 40. Incidentally, the pump shaft 22 constitutes what is referred to herein as a "stepless speed changer mechanism input section" and the motor shaft 25 constitutes what is referred to herein as a "stepless speed changer mechanism output section".

According to the configuration of the stepless speed changer mechanism 20 in operation, in association with an operation of a hydraulic cylinder operably connected to a swash plate 27 of the hydraulic pump 20P, this hydraulic cylinder effects change of an angle of the swash plate 27, whereby a speed change to a forward rotation state, a reverse rotation state or a neutral state between the forward rotation state and the reverse rotation state is effected. Further, in the event of speed change to the forward rotation state or to the reverse rotation state, the rotational speed of the hydraulic pump 20P is changed steplessly, thus steplessly changing the rotational speed of the hydraulic motor 20M, so that the rotational speed of the power to be outputted from the motor shaft 25 to the planetary gear mechanism 40 is varied steplessly.

The stepless speed changer mechanism 20, when speed-changed to the neutral state, stops driving of the hydraulic motor 20M by the hydraulic pump 20P and stops the output from the motor shaft 25 to the planetary gear mechanism 40.

The planetary gear mechanism 40 includes a sun gear 43 which receives power outputted from the stepless speed changer mechanism 20 and which rotatably supports a boss portion 43a via a bearing to a planetary gear case 41 provided inside the front transmission case 11a, three planet gears 44 disposed in distribution and equidistantly spaced apart from each other in the circumference of the sun gear 43, a carrier 46 which rotatably supports the respective planet gears 44 via support shafts 45 and which is configured to input the power outputted from the forward/reverse switching mechanism 50 without being steplessly speed-changed by the stepless speed changer mechanism 20, a ring gear 47 meshing with the three planet gears 44, and an output shaft 48 rotatably supported to the planetary gear case 41 via a bearing. Incidentally, the sun gear 43 constitutes what is referred to herein as a "planetary gear mechanism first input section" and the carrier 46 constitutes what is referred to herein as a "planetary gear mechanism second input section".

The carrier 46 is supported to the boss portion 43a of the sun gear 43 via a bearing to be rotatable relative thereto. A boss portion 47a of the ring gear 47 is rotatably supported to the planetary gear case 41 via a baring and is also rotatably supported to the boss portion 43a of the sun gear 43 via a bearing.

The support shaft 45 of each planet gear 44 is supported to the carrier 46 in a cantilever-manner, with being connected to the carrier 46 at one end side only. The three support shafts 45 are connected via a single annular support plate so that meshed states of the planet gears 44 relative to the sun gear 43 and the ring gear 47 are maintained thereby.

The planetary gear case 41 rotatably supports an input rotary body 42 in the form of a tubular shaft. This input rotary body 42 is operably coupled with the motor shaft 25 to be rotatable therewith via a spline engagement arrangement. The input rotary body 42 and the sun gear 43 are operably coupled with each other via meshing between a transmission gear 42a provided on the outer circumference side of the input rotary body 42 to be rotatable therewith and a driven gear 43b provided on the outer circumference portion of the boss portion 43a of the sun gear 43 to be rotatable therewith.

The ring gear 47 is operably coupled with the output shaft 48 via a spline arrangement provided between the boss portion 47a and the output shaft 48.

An input rotary body 49 in the form of a tubular shaft is rotatably supported to the planetary gear case 41. This input rotary body 49 is operably coupled with the pump shaft 22 to be rotatable therewith, through a spline engagement arrangement.

The input rotary body 49 and the carrier 46 are operably coupled with each other via meshing between a transmission gear 49a provided on the outer circumference side of the input rotary body 49 to be rotatable therewith and a driven gear 46a provided on the outer circumference portion of the carrier 46 to be rotatable therewith.

Namely, with the configuration of the planetary gear mechanism 40 in operation, the power outputted from the output shaft 55 by the forward/reverse switching mechanism 50 is inputted to the input rotary body 49 via the pump shaft 22, whereby the power from the forward/reverse switching mechanism 50 is inputted to the carrier 46 without being subjected to the speed changing effect of the stepless speed changer mechanism 20 and the power outputted from the motor shaft 25 by the stepless speed changer mechanism 20 is inputted to the sun gear 43, so that the power from the stepless speed changer mechanism 20 and the power from the forward/reverse switching mechanism 50 not subjected to the speed changing effect of the stepless speed changer mechanism 20 are synthesized and the resultant synthesized power is outputted from the output shaft 48 to the auxiliary speed changer mechanism 60.

The auxiliary speed changer mechanism 60 includes an input shaft 61 formed integral with the output shaft 48 of the planetary gear mechanism 40, a first gear 62a and a second gear 63a which are mounted on this input shaft 61 to be rotatable therewith, a third gear 62b meshed with the first gear 62a and mounted on the output shaft 64 to be rotatable relative thereto, a fourth gear 63b meshed with the second gear 63a and mounted on the output shaft 64 to be rotatable relative thereto, a first transmission clutch 65 mounted on the output shaft 64 to be rotatable therewith and connectable to either the third gear 62b or the fourth gear 63b, a fifth gear 66b rotatable with the fourth gear 63b, a sixth gear 66a meshed with the fifth gear 66b and mounted on a transmission shaft 67 to be rotatable therewith, a seventh gear 69a connectable with the transmission shaft 67 via a second transmission clutch 68, and an eighth gear 69b meshed with the seventh gear 69a and mounted on the output shaft 64 to be rotatable therewith.

In operation, when the first transmission clutch 65 is coupled with the third gear 62b by a shifting operation and the coupling of the second transmission clutch 68 with the seventh gear 69a is released, power inputted to the input shaft 61 from the planetary gear mechanism 40 is transmitted at a high speed to the output shaft 64 via the first gear 62a, the third gear 62b, and the first transmission clutch 65.

When the first transmission clutch 65 is coupled with the fourth gear 63b by a shifting operation and the coupling of the second transmission clutch 68 with the seventh gear 49a is released, the power transmitted to the input shaft 61 from the planetary gear mechanism 40 is transmitted at a low speed to the output shaft 64 via the second gear 63a, the fourth gear 63b and the first transmission clutch 65.

When the coupling of the first transmission clutch 65 with the third gear 62b and the coupling of the same with the fourth gear 63b are released by a shifting operation and the second transmission clutch 68 is coupled with the seventh gear 69a, the power inputted to the input shaft 61 from the planetary gear mechanism 40 is transmitted at an intermediate speed to the output shaft 64 via the second gear 63a, the fourth gear 63b, the fifth gear 66b, the sixth gear 66a, the transmission shaft 67, the second transmission clutch 68, the seventh gear 69a and the eighth gear 69b.

The rear wheel drive shaft 32 is operably coupled via a spline engagement arrangement with the output shaft 64 of the auxiliary speed changer mechanism 60 to be rotatable therewith.

The power outputted from the output shaft 64 is transmitted from the rear wheel drive shaft 32 via the rear wheel differential mechanism 33 to the rear wheels 2. The power outputted from the output shaft 64 is transmitted via the gear coupling mechanism 34 to the front wheel drive shaft 35 operably coupled with the rear wheel drive shaft 32 and transmitted via the front wheel speed changer mechanism 36 to the front wheel speed changer drive shaft 37 and then transmitted from this front wheel speed changer drive shaft 37 via the front wheel differential mechanism 38 to the front wheels 1.

With the configuration of the traveling transmission device D1 in operation, the output of the engine 3a is switched over between a forward drive and a reverse drive by the forward/reverse switching mechanism 50. The forward drive and the reverse drive outputted from the forward/reverse switching mechanism 50 is steplessly speed-changed by the planetary gear mechanism 40 and the output of its output shaft 48 is speed changed in a plurality of steps of a low speed, an intermediate speed and a high speed by the auxiliary speed changer mechanism 60 and the forward drive and the reverse drive speed-changed by the auxiliary speed changer mechanism 60 is transmitted from the output shaft 64 of the auxiliary speed changer mechanism 60 via the rear wheel differential mechanism 33 to drive the rear wheels 2 and also from the output shaft 64 of the auxiliary speed changer mechanism 60 via the gear coupling mechanism 34, the front wheel speed speed changer mechanism 36 and the front wheel differential mechanism 38 to drive the front wheels 1.

Figure 4:
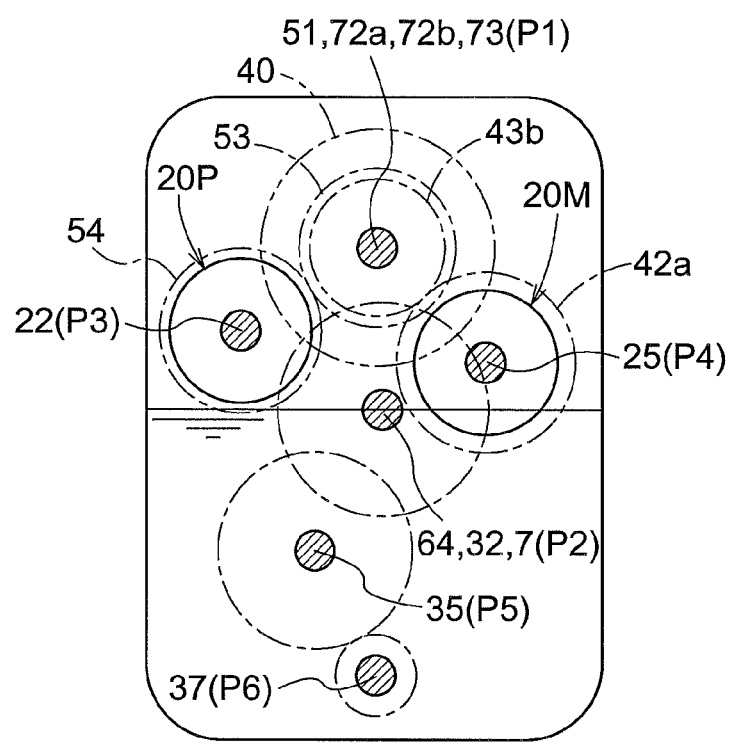
FIG. 4 is an explanatory view illustrating positional relations among respective axes.

As shown in FIG. 4, the output shaft 3b of the engine 3a, the input shaft 51 of the forward/reverse switching mechanism 50, the sun gear 43, the carrier 46 and the output shaft 48 of the planetary gear mechanism 40, the input shaft 61 of the auxiliary speed changer mechanism 60, the input side power transmission shaft 72a and the output side power transmission shaft 72b of the implement clutch 70, and a power speed changer transmission shaft 73 of the implement speed changer mechanism 71 all have their respective rotational axes disposed on a common first axis P1.

Generally, in order for one of two parallel rotational shafts to transmit power to the other, an arrangement such as meshing gears mounted on the rotational shafts or setting a chain or a transmission belt between sprockets mounted on the rotational shafts is needed and to this end, a large space is required. Further, the greater the presence of the gears or the like, the more reduction will occur in the transmission efficiency.

Whereas, in the case of the above-described arrangement, the input shaft 51 of the forward/reverse switching mechanism 50, the sun gear 43, the carrier 46 and the output shaft 48 of the planetary gear mechanism 40, the input shaft 61 of the auxiliary speed changer mechanism 60, the input side power transmission shaft 72a and the output side power transmission shaft 72b of the implement clutch 70, and a power speed changer transmission shaft 73 of the implement speed changer mechanism 71 all have their respective rotational axes disposed on a common first axis P1 coaxial with the rotational axis of the output shaft 3b of the engine 3a. This arrangement serves to avoid increase of space and deterioration in transmission efficiency.

The output shaft 64 of the auxiliary speed changer mechanism 60, the rear wheel differential mechanism 33, the brake shaft or the rear axle 31 of the rear wheels 2, and the PTO shaft 7 which receives transmission of power via a gear 74 and a gear 75 from the power speed changer transmission mechanism 73 have their respective rotational axes disposed on a common second axis P2. The height of this second axis P2 is set lower than the first axis P1.

The pump shaft 22 and the motor shaft 25 are disposed in distribution on the left and right sides of the first axis P1 in the front view of the vehicle body such that the heights of a third axis P3 in agreement with the rotational axis of the pump shaft 22 and a fourth axis P4 in agreement with the rotational axis of the motor shaft 25 are set at positions lower than the first axis P1 and higher than the second axis P2. Incidentally, the third axis P3 is disposed on the left side of the first axis P1 and the fourth axis P4 is disposed on the right side of the first axis P1, and the third axis P3 is set at a position slightly higher than the fourth axis P4.

The stepless speed changer mechanism 20 includes at least a hydraulic circuit disposed between the hydraulic pump 20P and the hydraulic motor 20M and mechanisms such as the hydraulic cylinder for driving the swash plate 27 of the hydraulic pump 20P, thus requiring certain amount of space for disposing these components. In this regard, if the stepless speed changer mechanism 20 were disposed only on either left or right side of the first axis P1 in the front view of the tractor, this would cause need for reinforcement of the vehicle body frame 5 on which the stepless speed changer mechanism is mounted or increase of the vehicle width.

By disposing the hydraulic pump 20P and the hydraulic motor 20M in distribution on the left and right sides relative to the rotational axis of the output shaft 3*b* of the engine 3*a* in the front view of the tractor, in particular, by disposing the third axis P3 and the fourth axis P4 in distribution on the left and right sides of the first axis P1, left-right uneven reinforcement of the vehicle body frame 5 or left-right uneven increase of the vehicle body becomes unnecessary.

The output shaft 55 of the forward/reverse switching mechanism 50 is provided continuously with the pump shaft 22 to be rotatable therewith via the spline engagement arrangement, to this output shaft 55 is coaxial with the third axis P3. Further, the transmission shaft 67 of the auxiliary speed changer mechanism 60 is not directly coupled with the pump shaft 22, but is disposed substantially on the roughly same axis as the third axis P3, rearwardly of the pump shaft 22.

The fifth axis P5 in agreement with the respective rotational axes of the front wheel drive shaft 35 and the clutch of the front wheel speed changer mechanism 36 is disposed at a position lower than the second axis P2 and slightly on the left side of the second axis P2 and on the right side of the third axis P3, in the vehicle body front view. The sixth axis P6 in agreement with the respective rotational axes of the front wheel speed changer shaft 37 and the front wheel differential mechanism 38 is disposed at a position lower than the fifth axis P5 and slightly on the left side of the second axis P2 and on the right side of the fifth axis P5 in the vehicle body front view.

The lubricant oil level is set at substantially same level as the second axis P2, and the output shaft 3*b* of the engine 3*a*, the forward/reverse switching mechanism 50, the planetary gear mechanism 40, a portion of the auxiliary speed changer mechanism 60, the implement clutch 70, the implement speed changer mechanism 71 and the hydraulic pump 20P are disposed upwardly of the oil level.

A portion of the auxiliary speed changer mechanism 60, the brake shaft or the rear axle 31 of the rear wheels 2 and the PTO shaft 7 are disposed at the oil level.

The front wheel drive shaft 35, the clutch of the front wheel speed changer mechanism 36, the front wheel speed changer drive shaft 37, the front wheel differential mechanism 38 and the brake shaft or the front axle 39 of the front wheels 1 are disposed downwardly of the oil level.

With the above-described arrangement of disposing the structurally bulky mechanisms such as the forward/reverse switching mechanism 50, the planetary gear mechanism 40, etc. upwardly of the oil level, it is possible to avoid transmission loss due to such mechanisms providing resistance against the gears provided in the forward/reverse switching mechanism 50 or the planetary gear mechanism 40 or unnecessary heat generation due to the above gears causing stirring of the lubricant oil.

On the other hand, the brake shaft or the front axles 39 of the front wheels 1 and the brake shaft or the rear axle 31 of the rear wheels 2 are placed in constant contact with the lubricant oil, so frictional heat generated by braking can be cooled speedily.

With the transmission apparatus D configured as described above, the engine 3*a* of the tractor will be started up with the forward clutch 52 and the reverse clutch 56 of the forward/reverse switching mechanism 50 and the implement clutch 70 being disengaged. Namely, this startup of the engine 3*a* of the tractor can be effected with being disconnected from the traveling transmission device D1 and the implement transmission device D2. Therefore, through reduction of the load torque at the time of startup of the engine 3*a*, size-up of the starter can be avoided.

By disposing the respective mechanisms constituting the traveling transmission device D1 and the implement transmission device D2 such that the lateral width of the transmission apparatus D as a whole may be formed compact in the vehicle body front view, increase of width of the vehicle body of the tractor can be prevented.

By providing the shapes of the clutch housing 10 and the front transmission case 11*a* of the transmission apparatus D as such shapes that allow connection thereof with the engine 3*a* and the rear transmission case 11*b* of an existing tractor, the transmission apparatus D of the present invention can be readily incorporated in the existing tractor also.

The invention claimed is:

1. A transmission apparatus provided in a tractor and configured to transmit power outputted from an engine to a traveling device and an implement, the transmission apparatus comprising:
   a forward/reverse switching mechanism;
   a hydrostatic stepless speed changer mechanism;
   a planetary gear mechanism;
   a rear wheel driving section; and
   an implement clutch;
   wherein the forward/reverse switching mechanism includes:
      a forward/reverse switching mechanism input section configured to input power outputted from an engine output section included in the engine, and
      a forward/reverse switching mechanism output section configured to switch over the power inputted to the forward/reverse switching mechanism input section to forward rotation or reverse rotation and to output the resultant power;
   wherein the stepless speed changer mechanism includes:
      a stepless speed changer mechanism input section configured to input the power outputted from the forward/reverse switching mechanism output section, and
      a stepless speed changer mechanism output section configured to steplessly speed-change the power inputted to the stepless speed changer mechanism input section and to output the resultant power;
   wherein the planetary gear mechanism includes:
      a planetary gear mechanism first input section configured to input the power outputted from the stepless speed changer mechanism output section,
      a planetary gear mechanism second input section configured to input the power outputted from the forward/reverse switching mechanism output section without the power being steplessly speed-changed by the stepless speed changer mechanism, and
      a planetary gear mechanism output section configured to synthesize the powers inputted to the planetary gear mechanism first input section and the planetary gear mechanism second input section and to output the resultant synthesized power;
   wherein the rear wheel driving section includes a rear wheel driving section input section configured to input the power outputted from the planetary gear mechanism output section; and
   wherein the implement clutch includes:
      an implement clutch input section configured to input the power outputted from the engine output section,
      an implement clutch output section capable of outputting the power inputted to the implement clutch input section, and
      wherein:

respective rotational axes of at least the engine output section, the forward/reverse switching mechanism input section, the planetary gear mechanism first input section, the planetary gear mechanism second input section, the planetary gear mechanism output section, and the implement clutch input section are disposed on a common first axis;

a second axis extending coaxially with a rotational axis of the rear wheel driving section input section is disposed below the first axis;

a third axis extending coaxially with a rotational axis of the stepless speed changer mechanism input section and a fourth axis extending coaxially with a rotational axis of the stepless speed changer mechanism output section;

the third axis and the fourth axis are disposed below the first axis and above the second axis; and the first axis, the second axis, the third axis and the fourth axis are disposed parallel with each other along a front/rear direction of the tractor in a side view of the tractor.

2. The transmission apparatus according to claim 1, wherein the third axis and the fourth axis are disposed in distribution on the left side and the right side of the first axis in a front view of the tractor.

3. The transmission apparatus according to claim 2, wherein:

the transmission apparatus further comprises a PTO section configured to input the power outputted from the implement clutch output section and to output this power to the implement; and wherein a rotational axis of the PTO section extends coaxially with the second axis.

4. The transmission apparatus according to claim 2, wherein an oil level of lubricant oil is set as the height of the second axis.

5. The transmission apparatus according to claim 1, wherein:

the transmission apparatus further comprises a PTO section configured to input the power outputted from the implement clutch output section and to output this power to the implement; and wherein a rotational axis of the PTO section extends coaxially with the second axis.

6. The transmission apparatus according to claim 5, wherein an oil level of lubricant oil is set as the height of the second axis.

7. The transmission apparatus according to claim 1, wherein an oil level of lubricant oil is set as the height of the second axis.

* * * * *